United States Patent
Li et al.

(10) Patent No.: US 9,674,656 B2
(45) Date of Patent: Jun. 6, 2017

(54) WIRELESS-BASED LOCALIZATION USING A ZONAL FRAMEWORK

(71) Applicant: Microsoft Technology Licensing, LLC, Redmond, WA (US)

(72) Inventors: Liqun Li, Beijing (CN); Guobin Shen, Beijing (CN); Chunshui Zhao, Beijing (CN); Feng Zhao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 14/185,768

(22) Filed: Feb. 20, 2014

(65) Prior Publication Data

US 2015/0237471 A1  Aug. 20, 2015

(51) Int. Cl.
*H04W 24/00* (2009.01)
*H04W 4/02* (2009.01)
*H04W 64/00* (2009.01)

(52) U.S. Cl.
CPC ........... *H04W 4/021* (2013.01); *H04W 4/028* (2013.01); *H04W 64/00* (2013.01)

(58) Field of Classification Search
CPC ...... H04W 4/021; H04W 4/028; H04W 64/00
USPC ............ 455/404.2, 412.1–414.2, 418–422.1, 455/435.1–444, 456.1, 456.2, 457; 370/328–332, 338
See application file for complete search history.

(56) References Cited

U.S. PATENT DOCUMENTS

| | | |
|---|---|---|
| 6,674,403 B2 | 1/2004 | Gray et al. |
| 6,826,162 B2 | 11/2004 | Haines et al. |
| 7,202,816 B2 | 4/2007 | Krumm et al. |
| 7,319,877 B2 | 1/2008 | Krumm et al. |
| 7,647,171 B2 | 1/2010 | Horvitz et al. |
| 7,738,881 B2 | 6/2010 | Krumm et al. |

(Continued)

FOREIGN PATENT DOCUMENTS

| | | |
|---|---|---|
| EP | 2602634 | 6/2013 |
| WO | WO03102622 | 12/2003 |

(Continued)

OTHER PUBLICATIONS

PCT Search Report and Written Opinion for PCT application No. PCT/US2015/014101, mailed Jun. 15, 2015, 9 pages.

(Continued)

*Primary Examiner* — Babar Sarwar

(74) *Attorney, Agent, or Firm* — Lee & Hayes, PLLC

(57) ABSTRACT

Disclosed herein are techniques and systems for performing wireless-based localization using a zonal framework. An area (i.e., surface or space) may be partitioned into multiple zones, and one or more signal propagation models for one or more wireless access points (APs) may be generated for each zone. The result is a set of zonal signal propagation models that allow for improved model fitness on a per-zone basis. A process includes receiving a location query associated with a wireless communication device, selecting a target zone among multiple available zones of an area, and estimating a location of the wireless communication device based at least in part on one of a signal propagation model associated with the target zone or a fingerprint-based localization. The signal propagation model associated with the target zone may be generated based on training samples observed exclusively within the target zone.

20 Claims, 7 Drawing Sheets

(56) References Cited

U.S. PATENT DOCUMENTS

| | | | |
|---|---|---|---|
| 7,783,303 B1 | 8/2010 | Lerner et al. | |
| 7,933,612 B2 | 4/2011 | Counts et al. | |
| 8,520,647 B2 | 8/2013 | Gray et al. | |
| 2006/0075131 A1* | 4/2006 | Douglas | G01S 5/0252 709/230 |
| 2011/0227791 A1 | 9/2011 | Lin et al. | |
| 2013/0143588 A1* | 6/2013 | Flanagan | H04W 64/00 455/456.1 |
| 2014/0194139 A1* | 7/2014 | Yang | G01S 5/0252 455/456.1 |

FOREIGN PATENT DOCUMENTS

| | | | |
|---|---|---|---|
| WO | WO2013085516 A1 | 6/2013 | |
| WO | WO2013165391 A1 | 11/2013 | |
| WO | WO2014022027 A1 | 2/2014 | |

OTHER PUBLICATIONS

Gellman, et al., "NSA tracking cellphone locations worldwide, Snowden documents show", Naional Security, Washington Post, retrieved from <<http://apps.washingtonpost.com/g/page/national/how-the-nsa-is-tracking-people-right-now/634/>>, available as early as Dec. 4, 2013, 6 pages.

Ritholtz, "How the NSA is tracking people right now", Washington Post, retrieved from <<http://www.washingtonpost.com/world/national-security/nsa-tracking-cellphone-locations-worldwide-snowden-documents-show/2013/12/04/5492873a-5cf2-11e3-bc56-c6ca94801fac_story.html >>, available as early as Dec. 5, 2013, 8 pages.

* cited by examiner

WIRELESS-BASED LOCALIZATION USING A ZONAL FRAMEWORK

BACKGROUND

Localization information is increasingly being leveraged for various location-based services (e.g., navigation, mobile commerce, etc.). These location-based services utilize information pertaining to the location of a mobile device to enable a multitude of computing applications. Often, the location of a mobile device may be obtained through the use of the existing global positioning system (GPS) (i.e., GPS satellites) due to the fact that most mobile devices are equipped with GPS receivers.

However, in certain environments (e.g., indoor environments), GPS signals are unavailable. Buildings and similar objects that obstruct GPS signals often lead to the unavailability of GPS signals used for localization. This has led to research efforts on localization for mobile devices using other, non-GPS approaches. At least one approach is to leverage the existing infrastructure of WiFi access points to enable localization based on available radio-frequency (RF) signals in lieu of the unavailable GPS signals. The WiFi infrastructure is widely deployed infrastructure and therefore suitable for localization due to the locality preserving properties of WiFi signals.

There are generally two techniques used for WiFi-based localization: (1) fingerprint-based localization, and (2) model-based localization. Fingerprint-based localization infers location of a device by comparing an observed WiFi sample against a location database, which contains a number of collected WiFi samples and their associated positions. The WiFi sample(s) that best matches the signal query is used for localization. However, fingerprint-based localization requires an extensive and costly pre-deployment effort to build the location database with enough training samples for accurate localization.

Model-based localization, on the other hand, does not rely too heavily on the density of training samples. Accordingly, the number of training samples used for model-based localization may be reduced significantly compared to fingerprint-based localization methods, which results in a much cheaper system. Model-based localization works by using a signal propagation model (e.g., a log-distance path loss (LDPL) model) of a WiFi signal to obtain model parameters of WiFi access points (APs) for predicting received signal strength (RSS) at various locations within an area. Thereafter, a location query with certain WiFi observations may be resolved to a location that best fits the WiFi observations to the signal propagation model.

While the model-based localization approach significantly reduces the pre-deployment effort and the associated cost of the system as compared to fingerprint-based localization, existing model-based approaches utilize a single ("global") model for localization within an entire area (e.g., an indoor environment) for each AP. A global path loss model uses a single path loss constant to reflect the assumption that RSS should decrease uniformly with increasing distance from a given WiFi AP. However, due to the complexity of many environments (e.g., walls, cubicles, pedestrians, etc.) that may all affect WiFi signal propagation, this assumption is not true of many environments, leading to uneven model fitness across different sub-areas of an environment having complex properties. In other words, model-based localization using a global signal propagation model for an entire area is oversimplified, leading to suboptimal performance of model-based localization systems.

SUMMARY

Described herein are techniques and systems for performing wireless-based localization based at least in part on a zonal framework. An area (i.e., surface or space) may be partitioned into multiple zones, and one or more signal propagation models may be generated for one or more wireless access points (APs) within each zone. The result is a set of zonal signal propagation models that allow for improved model fitness on a per-zone basis, leading to improved accuracy in performing localization of wireless communication devices within the area. The embodiments disclosed herein may be utilized in any environment containing an existing wireless communication infrastructure. Although the techniques and systems described herein are often presented in the context of indoor environments where GPS signals are typically unavailable, the embodiments disclosed herein are equally applicable to outdoor environments where a wireless communication infrastructure is available, notwithstanding the presence of available GPS signals. Thus, the techniques and systems described herein are not limited to indoor localization.

In some embodiments, a computer-implemented process of performing localization for a wireless communication device at an unknown location includes receiving a location query associated with the wireless communication device, selecting a target zone among multiple available zones of an area, and estimating a location of the wireless communication device based at least in part on one of a signal propagation model associated with the target zone (i.e., zonal model) or a fingerprint-based localization.

In some embodiments, a system configured to perform localization based on a zonal framework includes one or more processors, and one or more memories having the following components: a zonal localization component to receive a location query associated with a wireless communication device, and a zone selection component to select a target zone from multiple available zones of an area. The zonal localization component may be configured to estimate a location of the wireless communication device based at least in part on one of a signal propagation model associated with the target zone or a fingerprint-based localization.

By utilizing a zonal framework that partitions an area into multiple zones for facilitating zonal localization, performance (i.e., localization accuracy) may be improved by virtue of achieving better model fitness for any given location query from a wireless communication device. As long as sufficient training data is available to enable generation of valid zonal signal propagation models for wireless APs, the zonal framework will improve model-based localization using any given wireless communication infrastructure. In addition, denser training data will further improve the performance of the disclosed zonal framework, but the embodiments disclosed herein are suitable for high accuracy localization even with minimal training data available.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, techniques and systems for performing wireless-based localization using a zonal framework. The techniques and systems described herein may be implemented in a number of ways. Example implementations are provided below with reference to the following figures.

Example Area and Zone Partitioning

Figure 1:
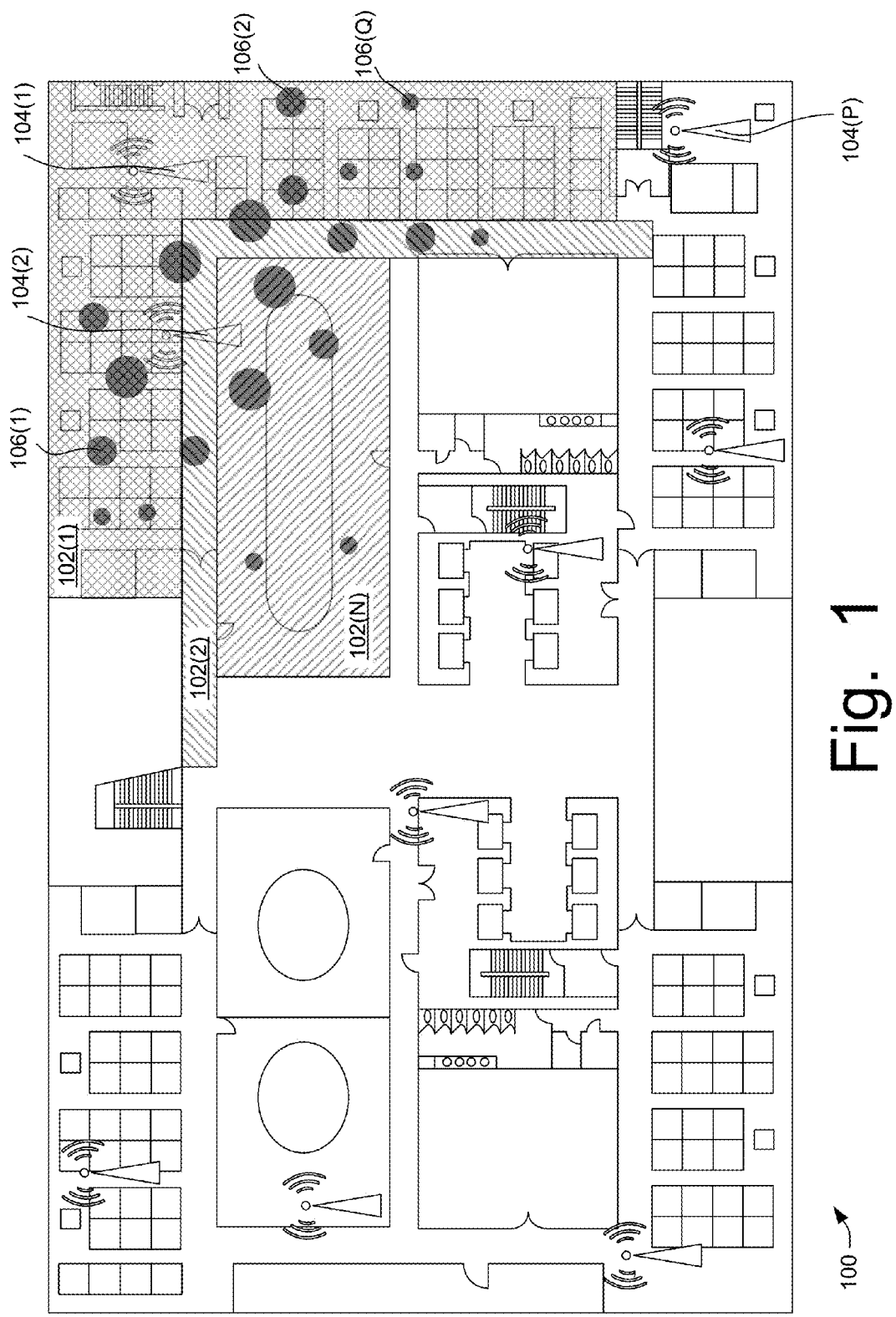
FIG. 1 illustrates an example area that may be partitioned into multiple zones for use with wireless-based localization techniques using zonal signal propagation models.

FIG. 1 illustrates an example area 100 that may be partitioned into multiple zones 102(1), 102(2), . . . , 102(N) for use with wireless-based localization techniques using zonal signal propagation models. FIG. 1 shows the area 100 as a two dimensional (2D) area that is representative of an indoor environment (e.g., an office building). It is to be appreciated, however, that areas, as used herein, are not limited to indoor areas, as outdoor areas with wireless communication infrastructures in place may also benefit from the disclosed techniques and systems. While the area 100 is represented as a 2D area, the area 100 comprises a three dimensional (3D) space, perhaps containing multiple levels (e.g., floors) that may be treated as sub-portions of the area 100 to be partitioned into zones. Any 2D surface included within the area 100 may be flat or curved, continuous or discontinuous, and any size and/or shape. FIG. 1 shows the area 100 as being rectangular in shape; typical of many indoor environments.

The area 100 of FIG. 1 is shown to include "complex" properties in terms of walls, doors, cubicles, partitions, glass windows, and even people (generally referred to as "objects" herein) that exist in the environment. By contrast, a completely empty indoor space without any objects disposed therein may be considered an area 100 that is simple and uniform, or otherwise not "complex".

The area 100 may further include a plurality of wireless access points (APs) 104(1), 104(2), . . . , 104(P) (e.g., WiFi APs) disposed at various locations throughout the area 100. The wireless APs 104(1)-(P) (sometimes called "WiFi APs 104(1)-(P)" herein) serve as radio-frequency (RF) transmitters configured to connect a group of wireless communication devices (e.g., mobile phones, tablets, etc.) to a wired local area network (LAN). The WiFi APs 104(1)-104(P) may act as network hubs configured to relay data between connected wireless communication devices and a connected wired device (e.g., an Ethernet hub or switch). This setup allows a plurality of wireless communication devices to utilize a wired connection for communication with other wired and wireless communication devices.

In some embodiments, the WiFi APs 104(1)-(P) may incorporate other functionalities as well, such as router functionality, or hub/switching functionality by acting as an Ethernet switch itself. In other embodiments, the WiFi APs 104(1)-(P) may be "thin" APs that merely send and receive wireless data. In general, the WiFi APs 104(1)-(P) support communications via frequencies defined by the IEEE 802.11 standards, but any suitable wireless communication protocol with available infrastructure may be used with the techniques and systems disclosed herein. WiFi APs that are based on IEEE 802.11 standards are widely deployed and are therefore contemplated for use as the WiFi APs 104(1)-(P) shown in FIG. 1. Thus, a WiFi AP is a wireless communication transceiver device (i.e., access point) that provides access to a network. Further, WiFi-enabled devices refer to wireless communication devices that use wireless local area network (WLAN) communication to exchange data with other similar devices and the WiFi APs 104(1)-(P). The WLAN communication may be performed via frequencies defined by the IEEE 802.11 standards.

FIG. 1 further illustrates a plurality of wireless communication samples 106(1), 106(2), . . . , 106(Q) (sometimes called "WiFi samples 106(1)-(Q)" herein) that have been observed throughout at least a portion of the area 100. Particularly, users carrying WiFi-enabled devices (e.g., mobile phones, tablets, etc.) and located throughout the area 100 record received signal strength (RSS) measurements corresponding to ones of the WiFi APs 104(1)-(P) in their view at those various locations. In some embodiments, the WiFi samples 106(1)-(Q) represent <location, RSS> tuples for each WiFi AP 104 seen by the WiFi-enabled device taking the WiFi sample 106. The size of each of the WiFi samples 106(1)-(Q) (shown as bubbles of varying size in FIG. 1) is indicative of the RSS measurements in terms of WiFi signal strength at that location. That is, the bigger the bubble for each WiFi sample 106(1)-(Q) shown in FIG. 1, the greater the RSS measurement. Accordingly, each of the WiFi samples 106(1), 106(2), . . . , 106(Q) is a wireless communication sample that indicates the strength of a wireless communication signal at a particular location.

The WiFi samples 106(1)-(Q) shown in FIG. 1 may make up training data for model-based localization because the model parameters for each WiFi AP 104(1)-(P) may be calculated for a path loss signal propagation model (e.g., a LDPL model) from the information that is reported by the WiFi samples 106(1)-(Q). Although the embodiments herein are predominantly described with reference to using an LDPL model, other models, such as linear models, may be utilized herein without changing the basic characteristics of the system. In general, the WiFi samples 106(1)-(Q) may be reported to a localization server and used to train zonal signal propagation models, and to perform localization for WiFi-enabled devices using the zonal models.

The techniques and systems described herein use a zonal framework that is based on the multiple zones 102(1)-(N) into which the area 100 is partitioned or divided. FIG. 1 shows that a first zone 102(1) encompasses a sub-area of the area 100 that contains multiple cubicles, while a second zone 102(2) encompasses another sub-area that is a corridor or walking pathway/hallway for people to traverse the area 100, and an $N^{th}$ zone 102(N) encompasses a conference room. The zone partitioning shown in FIG. 1 is but one illustrative example manner in which the area 100 may be partitioned into multiple zones 102(1)-(N), and it is to be appreciated that various suitable techniques for partitioning the area 100 into multiple zones 102(1)-(N) are contemplated without changing the basic characteristics of the system disclosed herein. Examples of various zone partitioning techniques will be discussed in more detail below.

According to embodiments herein, zonal signal propagation models may be generated or built for the WiFi APs 104(1)-(P) based on observations from the respective zones 102(1)-(N). In general, a valid zonal signal propagation model may be generated from a threshold number of training samples observed within a specific zone 102. In some embodiments, the threshold number of training samples to be observed is five training samples. This threshold number of five training samples is primarily based on the fact that there are generally four parameters of a LDPL model that are to be solved for in building the respective zonal signal propagation model. Equation (1), below, shows a LDPL equation that may be used for any given zonal signal propagation model:

$$p_{ij} = P_i - 10\gamma_i \log d_{ij} + R \quad (1)$$

In Equation (1), $p_{ij}$ represents the RSS measurement (e.g., measured in decibel-milliwatts (dBm)) seen by a WiFi-enabled device at a certain unknown location, j, that is a distance from the $i^{th}$ WiFi AP 104. $P_i$ is the RSS measured at the reference point (typically 1 meter away from the AP) of the ith WiFi AP 104, $\gamma i$ is the path loss constant (i.e., rate of decrease in RSS in the vicinity of the $i^{th}$ WiFi AP 104). $D_{ij}$ is a distance from the WiFi-enabled device at location, j, to the $i^{th}$ WiFi AP 104, and R is a random constant used to model the variations in the RSS due to multi-path effects. After collecting a threshold number (in the case of Equation (1), five) of WiFi samples 106(1)-(Q) for each zone 102(1)-(N), the set of parameters for each WiFi AP 104(1)-(P) may be calculated by minimizing the average model fitness error according to Equation (2), below:

$$\text{model fitness error} = \frac{1}{k}\sum_{i=1}^{k} |\text{model } RSS - \text{measured } RSS| \quad (2)$$

In Equation (2), k is the number of WiFi samples 106(1)-(Q) observed in the respective zone 102 for which the model is being generated. Accordingly, one or more zonal models may be trained for each WiFi AP 104(1)-(P) within the area 100. Accordingly, any given WiFi AP 104 may have multiple zonal models because Wi-Fi enabled devices may see the given WiFi AP 104 from different zones of the multiple zones 102(1)-(N). Conversely, a given WiFi AP 104 may not be associated with any zonal models if there is not enough training data available to build a valid zonal model.

In some embodiments, a fallback measure may be taken by training a global model for particular ones of the WiFi APs 104(1)-(P) in the area 100. Such a global model may be used for WiFi APs 104 that are not associated with a zonal signal propagation model for at least one zone 102. For example, for a given WiFi AP 104 within a particular zone 102, if the number of WiFi samples 106 within the particular zone 102 is insufficient (e.g., below a threshold number of samples needed for a valid zonal model), while the number of all WiFi samples 106 in view of the given WiFi AP 104 is sufficient (e.g., at or above a threshold) for a valid global model, a global model may be trained for the given WiFi AP 104 and associated with the particular zone 102. Accordingly, the number of WiFi samples 106 may be sufficient for some of the zones 102(1)-(N), yet insufficient for others of the zones 102(1)-(N). For example, if the area 100 were to contain ten WiFi samples 106(1)-(Q), with six of the WiFi samples 106(1)-(Q) within a first zone 102(1), and four of the WiFi samples 106(1)-(Q) in a second zone 102(2), the first zone may have a zonal model generated for it if six WiFi samples 106 are sufficient for zonal model generation, while the second zone 102(2) may fall back to using a trained global model based on all ten WiFi samples 106(1)-(Q).

Example Architecture

Figure 2:
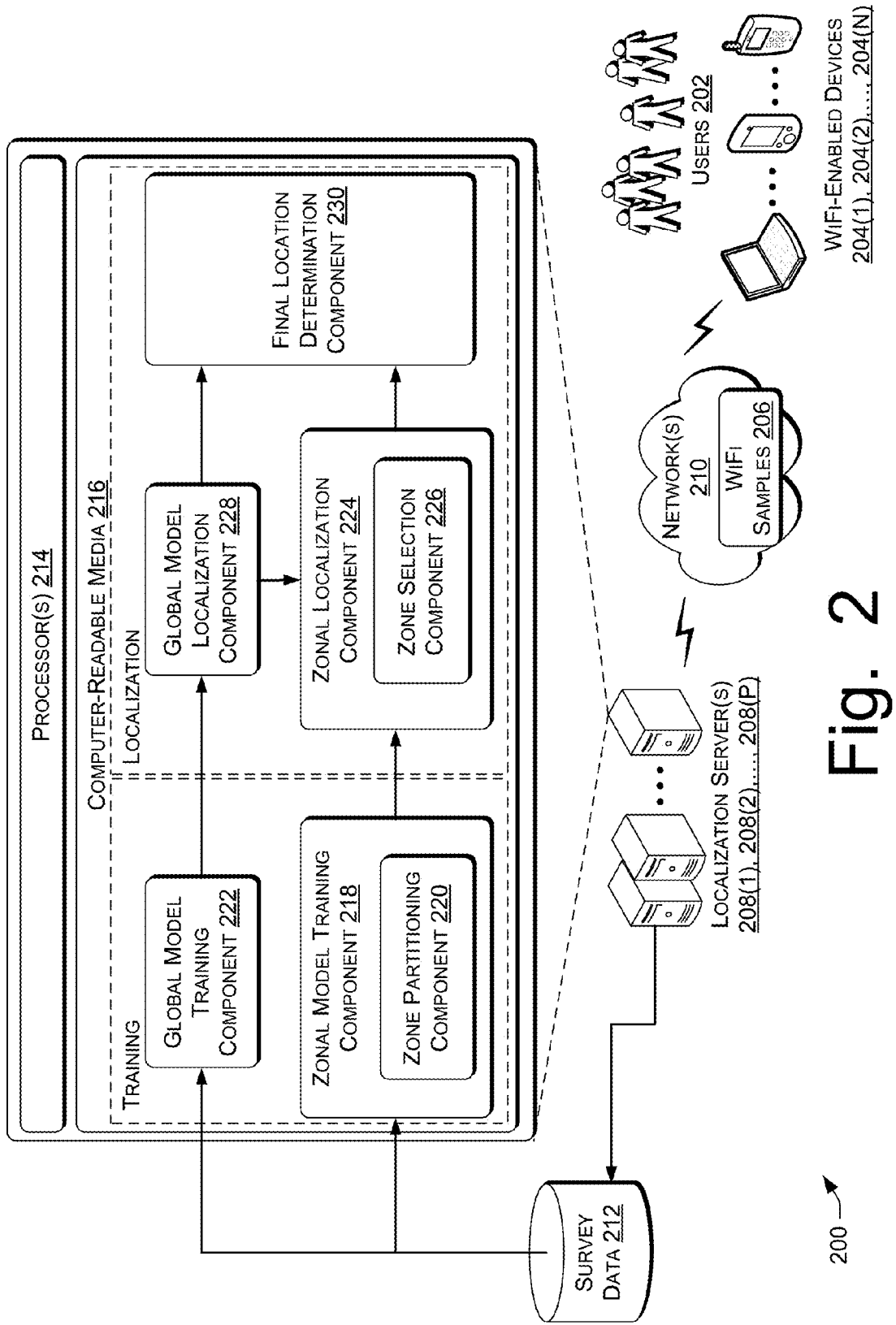
FIG. 2 illustrates an example architecture for performing wireless-based localization using a zonal framework, including a block diagram representing example localization server(s).

FIG. 2 illustrates an example architecture 200 for performing wireless-based localization using a zonal framework. In the architecture 200, one or more users 202 are associated with mobile, wireless communication computing devices ("wireless communication devices" or "WiFi-enabled devices") 204(1), 204(2) . . . , 204(N) that are configured to assist in the zonal (and global) model training, and to facilitate localization of the WiFi-enabled devices 204(1)-(N). For enabling model training, the WiFi-enabled devices 204(1)-(N) may be configured to scan for WiFi APs, such as the WiFi APs 104(1)-(P) shown in FIG. 1, in their range, and to receive and record RSS measurements corresponding to the WiFi APs 104(1)-(P) in their view (i.e., in range) at various locations throughout an area, such as the area 100 of FIG. 1. The WiFi-enabled devices 204(1)-(N) may transmit WiFi samples 206 based on such RSS measurements to one or more localization servers 208(1), 208(2), . . . , 208(P) via a network(s) 210. These WiFi samples 206 may comprise observations of RSS measurements used as training data for training zonal and global signal propagation models.

To facilitate a localization process, however, the WiFi-enabled devices 204(1)-(N) may be similarly configured to transmit location queries in the form of the WiFi samples 206 to the localization server(s) 208(1)-(P) in order to resolve a current position or location. In either of the training process or the localization process, the detection and transmission of WiFi samples 206 via the network(s) 210 may be implemented as a push model where the WiFi-enabled devices 204(1)-(N) periodically scan and push information to the localization server(s) 208(1)-(P), or as a pull model where the localization server(s) 208(1)-(P) request a scan.

The WiFi-enabled devices 204(1)-(N) may be implemented as any number of computing devices, including a laptop computer, a portable digital assistant (PDA), a mobile phone, a tablet computer, a portable media player, portable game player, smart watch, and so forth. Each client computing device 204(1)-(N) is equipped with one or more processors and memory to store applications and data. According to some embodiments, a localization application is stored in the memory and executes on the one or more processors to provide the WiFi samples 206 to the localization server(s) 208(1)-(P) and/or perform a localization process on the WiFi-enabled devices 204(1)-(N), such as when trained zonal (and global) signal propagation models may be downloaded over the network(s) 210 from the localization server(s) 208(1)-(P). In this manner, model training may be performed on the localization server(s) 208(1)-(P), while localization may be performed on the WiFi-enabled devices 204(1)-(N). Alternatively, both training and localization may be performed on the localization server(s) 208(1)-(P).

Although the network(s) 210 is described in the context of a web-based system, other types of client/server-based communications and associated application logic may be used. The network(s) 210 is representative of many different types of networks, such as cable networks, the Internet, local area networks, mobile telephone networks, wide area networks and wireless networks, or a combination of such networks.

The localization server(s) 208(1)-(P) may comprise one or more servers, perhaps arranged as a server farm or a server cluster. Other server architectures may also be used to implement the localization server(s) 208(1)-(P). In some embodiments, the localization server(s) 208(1)-(P) are capable of handling requests, such as location queries, from many users 202 and serving, in response, various information and data regarding position determinations to the WiFi-enabled devices 204(1)-(N), allowing the user 202 to interact with the data provided by the localization server(s) 208(1)-(P). In this manner, the localization server(s) 208(1)-(P) may be implemented as part of any site or service supporting localization for users 202 associated with the WiFi-enabled devices 204(1)-(N), including location-based services, navigation services, mobile commerce services, and so forth.

In some embodiments, the WiFi samples 206 are received by the localization server(s) 208(1)-(P) and stored in a data store as survey data 212, such as during a training phase for training or building zonal (and global) signal propagation models. This survey data 212 may be collected in any suitable type of data store for storing data, including, but not limited to, a database, file system, distribution file system, or a combination thereof. The survey data 212 may be configured to collect any suitable information that is included in the WiFi samples 206 received via the network(s) 210, such as RSS measurements, identification and location information pertaining to in-range WiFi APs 104(1)-(P), and the like.

In general, the localization servers 208(1)-(P) are equipped with one or more processors 214 and one or more forms of computer-readable media 216. The localization servers 208(1)-(P) may also include additional data storage devices (removable and/or non-removable) such as, for example, magnetic disks, optical disks, or tape. Such additional storage may include removable storage and/or non-removable storage. Computer-readable media 216 may include, at least, two types of computer-readable media 216, namely computer storage media and communication media. Computer storage media may include volatile and non-volatile, removable, and non-removable media implemented in any method or technology for storage of information, such as computer readable instructions, data structures, program modules, or other data. The system memory, the removable storage and the non-removable storage are all examples of computer storage media. Computer storage media includes, but is not limited to, random access memory (RAM), read-only memory (ROM), erasable programmable read-only memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other non-transmission medium that may be used to store the desired information and which may be accessed by the localization servers 208(1)-(P). Any such computer storage media may be part of the localization servers 208(1)-(P). Moreover, the computer-readable media 216 may include computer-executable instructions that, when executed by the processor(s) 214, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computer-readable media 216 may be used to store any number of functional, or executable, components, such as programs and program modules that are executable on the processor(s) 214 to be run as software. The components included in the computer-readable media 216 may serve primarily one of two purposes, which are either to develop and train signal propagation models (labeled "Training" in the block diagram of FIG. 2), or to perform localization for the WiFi-enabled devices 204(1)-(N) (labeled "Localization" in the block diagram of FIG. 2).

Training

The main component used for development and training of the zonal signal propagation models, according to embodiments disclosed herein, is a zonal model training component 218 that is configured to generate one or more zonal signal propagation models for individual ones of the WiFi APs 104(1)-(P). The zonal model training component 218 may generate the one or more zonal propagation models by solving for model parameters of a path loss model based on observations within particular ones of the zones 102(1)-(N) obtained from the survey data 212.

As part of this zonal model training process, the zonal model training component 218 may include a zone partitioning component 220 that is configured to divide or partition an area 100 of interest into multiple zones 102(1)-(N). Zone partitioning may be performed in a variety of suitable ways using various techniques and algorithms.

In some embodiments, the area 100 may be partitioned into multiple zones by leveraging a map tile system that uses, for example, a quad-tree structure across multiple levels of detail (i.e., zoom levels) to partition a planar map into tiles. Each tile of a certain area may be treated as a zone of the area 100. In this scenario, the zones are uniform in size and shape at a given level of the map tile system, since map resolution is a function of the zoom level. One illustrative example of a map tile system is the Bing® Maps Tile System provided by Microsoft® Corporation of Redmond, Wash. In such a map tile system, a map of an area may be rendered at different levels having square sub-areas of a certain side length that may be measured in real distance measurements (i.e., feet, meters, etc.) based on the zoom level and the latitude that is rendered. Each tile of a known side length may then be designated as a zone. The identifiers of each tile may be used to identify each zone of the area 100. In the example area 100 shown in FIG. 1, the entire area 100 may be representative of a rendered map of a map tile system at a zoom level that is relatively close to the surface of the earth.

In some embodiments, the zone partitioning component 220 may partition the area 100 into multiple zones by using basic rules that specify a maximum or minimum size of a geometric shape suitable for the area 100. For example any suitable polygonal shape of a maximum or minimum size may be utilized to partition the area 100 into multiple zones. In other embodiments, zones may be partitioned at least partly using a manual, or human, process.

In yet other embodiments, the zone partitioning component 220 may partition the area 100 based on the availability of training data within the area 100. For example, the zone partitioning component 220 may be configured to determine sub-areas within the area 100 that contain at least a threshold number (e.g., five) of observed training samples, such as the WiFi samples 206, and may designate each sub-area that meets the threshold criterion as a separate zone within the area 100. As another example, a sub-area found to contain more than a threshold number of observed training samples may be bisected into smaller sub-areas as long as those resulting sub-areas contain a threshold number of training samples. As yet another example, the zone partitioning component 220 may designate "seeding locations" (selected randomly or using rules such as "inner most" portion of the area 100 or at the corners of the area 100) and may grow sub-areas around the seeding locations until a threshold number of training samples are contained within the sub-area, and these may be designated as zones of the area 100. Other suitable means of partitioning the area 100 into multiple zones may be utilized without departing from the basic characteristics of the system disclosed herein.

In some embodiments, the zone partitioning component 220 may partition the area into multiple zones, at least some of which are overlapping each other. Use of overlapping zones may mitigate any large model fitness errors observed at zone boundaries.

In some embodiments, sub-areas that do not contain any, or enough, training data may be regarded or designated as "empty zones." The empty zones may not be associated with a zonal signal propagation model because a valid zonal signal propagation model may require a threshold amount of training samples. Accordingly, zone partitioning may be performed without regard to the availability of training data, in which case, some zones may turn out to be empty zones. In other embodiments, zone partitioning may depend on, or be driven by, the availability of training data so that only certain sub-areas of the area 100 are designated as zones, while the remaining portion(s) of the area 100 make up a portion of the area that may be treated as a "global" zone.

In certain scenarios, portions of the area 100 may be more heavily traversed with WiFi-enabled devices 204(1)-(N) than others, and those sub-areas lend themselves to smaller zone sizes based on the high density of training data in those sub-areas. For example, walking pathways, or similar "common areas" within an environment, may have more training data available, while private offices or other restricted locations may not have any, or enough, training data in order to build valid zonal signal propagation models. Accordingly, the zone partitioning component 220 may be configured to identify sub-areas of an area 100 as "high traffic" sub-areas for finer zone partitioning, which may lead to greater localization accuracy.

The computer-readable media 216 may further include a global model training component 222 as part of the model training capability of the localization server(s) 208(1)-(P). The global model training component 222 is configured to train a global model for a given area 100 based on all observations (i.e., WiFi samples 206) from all WiFi APs 104(1)-(P) within the area 100. Thus, a global model may be obtained and utilized for various fallback measures or augmentation of the localization process to resolve a location of a WiFi-enabled device 204 with greater accuracy.

Both of the zonal and global model training components 218 and 222 may dispatch WiFi-enabled devices 204(1)-(N) to the area 100, including within the multiple zones 102(1)-(N), to collect the survey data 212 (i.e., training data) used for training the zonal and global models. Additionally, or alternatively, users 202 with associated WiFi-enabled devices 204(1)-(N) that are already within the area 100 may be leveraged for receiving WiFi samples 206 for the survey data 212. In either case, the area 100 may be partitioned into multiple zones without regard to the training samples, or the dispatched/existing training samples may actually drive the partitioning of the area 100 into zones. For any given WiFi AP 104 within a zone 102, as long as enough training data is available, a zonal model for the given WiFi AP 104 may be established. Accordingly, not all WiFi APs 104(1)-(P) will have a zonal signal propagation model for each zone. Any WiFi AP 104 without a zonal signal propagation model in a certain zone may use the fallback global model for that zone without a zonal signal propagation model for localization purposes. The global model may be developed by the global model training component 222.

After training, the zonal model training component 218 may maintain a model parameter set (e.g., transmission power, P, path loss coefficient, γ, etc.) for each WiFi AP 104(1)-(P). These model parameter sets may be generated based on minimizing the model fitness error, as described above. Thus, each zone of the multiple zones 102(1)-(N) may be associated with a plurality of parameter sets, one parameter set for each WiFi AP 104(1)-(P). Likewise, a single WiFi AP 104 may have different model parameter sets for different ones of the multiple zones 102(1)-(N).

In some embodiments, the zonal signal propagation models may be optimized by the zonal model training component 218 by including a certain portion of training data from neighboring zones. That is, in developing a zonal model for a given zone, the zonal model training component 218 may look to available training data in zones neighboring (e.g., adjacent) the given zone in order to develop a valid zonal signal propagation model for the given zone. This technique of including training data from neighboring zones may enable empty zones to obtain valid zonal models so long as there is enough training data available from neighboring zones.

Localization

The main component used for zonal localization, according to embodiments disclosed herein, is a zonal localization component 224 that is configured to estimate a location of a given WiFi-enabled device 204 based at least in part on one of a zonal signal propagation model developed during the training phase, or a fingerprint-based localization scheme.

As part of this zonal localization process, the zonal localization component 224 may include a zone selection component 226 that is configured to select a target zone among multiple available zones of an area, such as the area 100 of FIG. 1. The goal of the zone selection component 226 is to find the zone with the best locality for a given location query received from a WiFi-enabled device 204. That is, the selected target zone should be the zone that the querying WiFi-enabled device 204 is currently disposed within. However, since the location of the querying WiFi-enabled device 204 is unknown, various methodologies and techniques may be utilized to carry out zone selection for purposes of localization.

In general, the zone selection component 226 is configured to select a target zone by pruning away, or otherwise ignoring, unlikely zones and pick a best candidate(s) zone as the target zone. By pruning away, or ignoring, unlikely zones, the zone selection component 226 may reduce system complexity for the zone selection process without compromising localization accuracy. In some embodiments, this pruning or filtering may be implemented using a bloom filter, which rapidly, and memory-efficiently, determines whether a zone is excluded from the set of candidate zones. More specifically, a bloom filter may be created for each zone with access to information on all of the WiFi APs 104(1)-(P) in each zone. The bloom filter may then hash all of the WiFi APs 104(1)-(P) observed in a WiFi sample 206 from a WiFi-enabled device 204 in each zone, and compare the WiFi APs 104(1)-(P) in the WiFi sample 206 to each zone's listing of WiFi APs 104(1)-(P). If a common identifier for a WiFi AP 104 is found for a particular zone based on the comparison, the corresponding bits of the zone's bloom filter may be set to 1, and the zones that are not set to 1 are excluded from the set of candidate zones. The zone selection component 226 may then determine if the number of common WiFi APs 104(1)-(P) in a zone meets or exceeds a threshold number (e.g., four common WiFi APs), and if not, that zone may be filtered out of the candidate set. Zones within the candidate set may be ranked based on the number of common WiFi APs 104(1)-(P) to those reported in the WiFi sample 206.

In some embodiments, the zone selection component 226 selects a target zone from the multiple available zones 102(1)-(N) using a Naïve Bayesian zone selection technique that involves receiving a WiFi sample 206 from a WiFi-enabled device 204, in which the WiFi sample 206 reporting a RSS measurement from one or more of the WiFi APs 104(1)-(P). Based on the selection, the zone selection component 226 uses histograms of the one or more WiFi APs 104(1)-(P) to calculate a likelihood of observing the received WiFi sample 206 in individual ones of the multiple available zones 102(1)-(N). The zone that maximizes the likelihood of observing the WiFi sample 206 is then selected as the target zone for localization purposes. This zone selection process may include pruning away or filtering out zones based on a comparison of WiFi APs 104(1)-(P) in the area 100 to the WiFi APs 104(1)-(P) reported in the WiFi sample 206 to obtain a set of candidate zones with at least one common WiFi AP 104 to the WiFi APs 104(1)-(P) reported in the WiFi sample 206. In this manner, only histograms of the WiFi APs 104(1)-(P) within the candidate zones are to be considered in the zone selection process.

It should be appreciated that in order to carry out the embodiments disclosed herein, all of the WiFi APs 104(1)-(P) in a zone may be associated with a histogram. Each histogram is a probability distribution of the observed RSS measurements at various locations within a zone of the area 100. Accordingly, each zone is associated with a probability distribution for a single WiFi AP 104. As noted above, the histograms of the WiFi APs 104(1)-(P) may be utilized for zone selection purposes. On the other hand, empty zones should not require a histogram. As noted above, a global signal propagation model may be utilized for such empty zones, and in some embodiments, the empty zones may be merged into a single "zone" that utilizes the global signal propagation model for localization purposes.

In some embodiments, the zone selection component 226 selects a target zone using a "Closest Zone" approach by obtaining an estimated location of a WiFi-enabled device 204 using the global signal propagation model associated with the entire area 100, and subsequently selecting the target zone as the zone with a center that is closest to the estimated location. The distance determination for determining a closest center may be based on Euclidean distance, according to some embodiments.

In some embodiments, the zone selection component 226 selects a target zone using a "Minimum Error" approach by obtaining an estimated location of a WiFi-enabled device 204 using the global signal propagation model, and selecting a subset of closest zones among the multiple zones 102(1)-(N) based on the distance of those zones to the estimated location. The zonal signal propagation models associated with those closest zones may then be used to perform respective localizations for the WiFi-enabled device 204, and the target zone may be selected as the zone that minimizes a model fitness error between the WiFi sample 206 and the different zonal signal propagation models.

In some embodiments, the zone selection component 226 may be configured to obtain a set of candidate zones using any of the techniques disclosed above, and to perform localization based on zonal signal propagation models for each of the zones in the set of candidate zones. The final zonal-based location may then be taken as the average of the locations obtained using each zonal model. In some embodiments, a weighted average may be used where the weight is a zone selection score, perhaps based on a number of common WiFi APs 104(1)-(P), or other suitable scoring or ranking methodologies. Using an average of multiple zonal localizations from different zones for resolving the final location helps to mitigate the impact of selecting a "wrong" zone (i.e., a zone that the querying WiFi-enabled device 204 is not actually disposed within).

In some embodiments, the zonal localization component 224 is configured to determine a localization scheme between a zonal model-based approach and a fingerprint-based approach after a target zone is selected by the zone selection component. The selection between using a zonal model-based approach and a fingerprint-based approach may depend on the density and coverage of training data within the target zone selected. Whichever scheme is utilized, the zonal localization component 224 resolves the location of the WiFi-enabled device 204 according to the chosen scheme.

FIG. 2 further shows that the computer-readable media 216 may further comprise a global model localization component 228 that is configured to use the global signal propagation model to perform localization for a location query from a WiFi-enabled device 204. The localization process for the global model is the same as the zonal model-based localization, except that there is no zone selection involved in the process since the global signal propagation model is based on the entire area 100 and all of the WiFi APs 104(1)-(P). The global model localization component 228 provides either or both of a fallback or augmentation capability for instances where the global model may improve localization accuracy. For example, where there are empty zones and/or WiFi APs 104(1)-(P) for which a valid zonal model cannot be established, the global signal propagation model may be used for localization purposes. Additionally, for certain zones, the global signal propagation model may actually result in better performance. In this case, the global signal propagation model may be treated as a persistent candidate for localization such that the location estimated by the global model may be used if it results in a smaller model fitness error.

The computer-readable media 216 may further include a final location determination component 230 that is configured to resolve a final location when multiple estimated locations are computed, such as when the global model localization component 228 estimates a location in addition to an estimated location by the zonal localization component 224, and the model fitness errors are compared to resolve the final location estimation.

Example Processes

FIGS. 3-7 describe illustrative processes that are illustrated as a collection of blocks in a logical flow graph, which represents a sequence of operations that may be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes.

Figure 3:
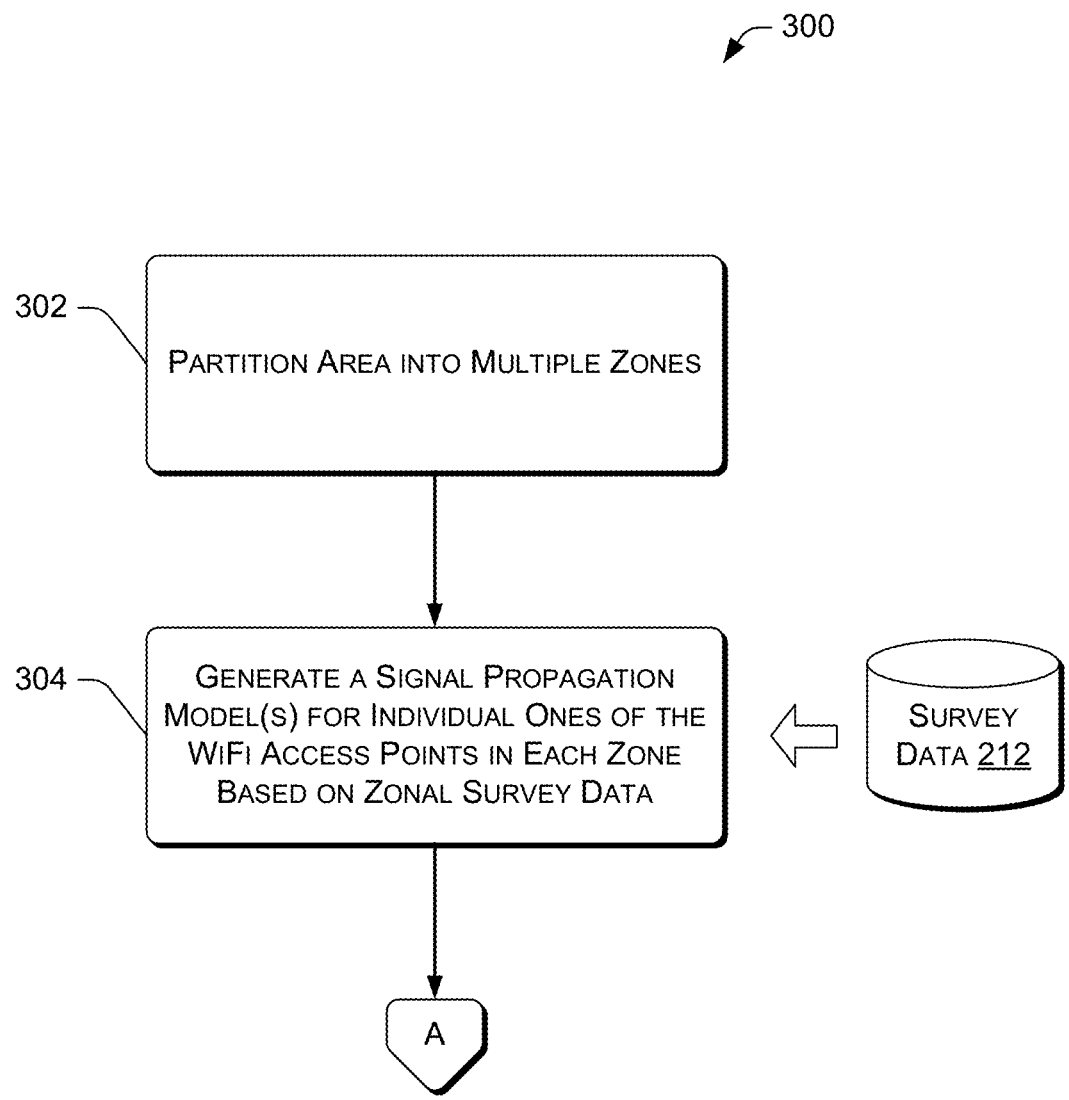
FIG. 3 is a flow diagram of an illustrative process for zonal model training.

FIG. 3 is a flow diagram of an illustrative process 300 for zonal model training. For discussion purposes, the process 300 is described with reference to the architecture 200 of FIG. 2, and specifically with reference to the zonal model training component 218, including the zone partitioning component 220.

At 302, the zone partitioning component 220 may partition an area, such as the area 100 of FIG. 1, into multiple zones, such as the multiple zones 102(1)-(N). As discussed above, the area 100 may be partitioned using various techniques, such as by leveraging a map tile system to designate tiles at a certain level of the map tile system as separate zones within the area. Other basic rules (e.g., specifying polygonal shapes of a min. or max. size) or manual processes may be utilized for zone partitioning at 302. Zones may be isolated or overlapping and may be of uniform or non-uniform size and shape. Moreover, the availability of training data may drive the partitioning of an area into zones, such as by designating sub-areas around a threshold amount of available training data as zones of the area 100. In other embodiments, zone partitioning at 302 is not dependent on the availability of training data, which may ultimately result in some zones being "empty" zones, as described above.

At 304, the zonal model training component 218 generates or builds one or more zonal signal propagation models for individual ones of one or more WiFi APs 104(1)-(P) within each of the multiple zones determined at 302. Sufficient survey data 212 is acquired to build valid zonal signal propagation models. Observations of training samples within a particular zone may be used to build a zonal signal propagation model for that zone by solving for model parameters using the survey data 212 within the zone. However, if no training data is available for a particular zone, the particular zone may be designated as an empty zone, or the particular zone may "borrow" at least some of the training data available in neighboring zones. The result of the process 300 is a zonal model framework with WiFi APs 104(1)-(P) that are associated with zonal signal propagation models for the multiple zones 102(1)-(N) of the area 100.

Figure 4:
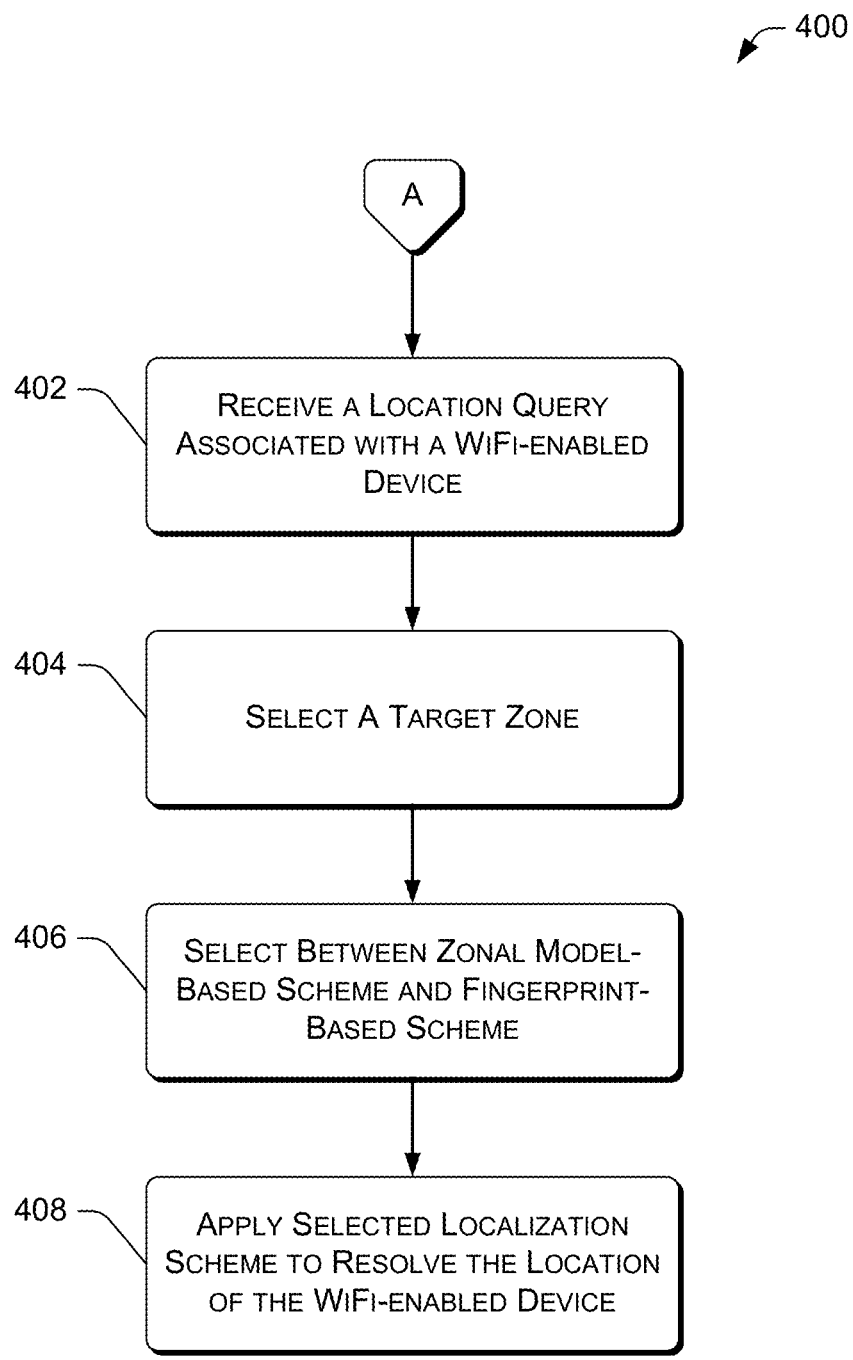
FIG. 4 is a flow diagram of an illustrative process for zonal localization.

FIG. 4 is a flow diagram of an illustrative process 400 for zonal localization. The illustrative process 400 may continue from step 304 of the process 300 of FIG. 3 (as designated by the "A" indicator of FIGS. 3 and 4), perhaps as part of a real-time zonal model training and localization process. For discussion purposes, the process 400 is described with reference to the architecture 200 of FIG. 2, and specifically with reference to the zonal localization component 224, including the zone selection component 226.

At 402, the zonal localization component 224 receives a location query associated with a WiFi-enabled device 204. This location query may be in the form of a WiFi sample 206 that indicates in-range WiFi APs 104(1)-(P) and associated RSS measurements from the WiFi APs 104(1)-(P).

At 404, the zone selection component 226 selects a target zone among multiple available zones of an area 100 where the WiFi-enabled device 204 is located. As described above, there are various ways by which the target zone may be selected at 404, including using a Naïve Bayesian zone selection technique based on histograms of at least some of the WiFi APs 104(1)-(P) within the area 100. Other suitable approaches include the "Minimum error" approach, or the "Closest Zone" approach, as described above. The selection of the target zone at 404 may include pruning away, or otherwise ignoring, unlikely zones, such as by using a Bloom filter for the respective zones to compare common WiFi APs 104(1)-(P) in each zone to the in-range WiFi APs included in the WiFi sample 206 received at 402.

At 406, the zonal localization component 224 selects a localization scheme between a zonal model-based localization scheme and a fingerprint-based localization scheme to use for localization within the target zone selected at 404. In some embodiments, the scheme selection at 406 may depend on the density and coverage of training data (i.e., WiFi samples 106(1)-(Q)) within the target zone selected at 404.

At 408, the zonal localization component 224 applies the localization scheme selected at 406 to estimate a location of the WiFi-enabled device 204. When the zonal model-based scheme is selected, for example, a zonal signal propagation model associated with the target zone may be applied to estimate a location of the WiFi-enabled device 204. When the fingerprint-based scheme is selected at 406, the zonal localization component 224 may determine a matching WiFi sample 106 within a database of WiFi samples 106(1)-(Q) and their corresponding locations to estimate the location of the WiFi-enabled device 204. Accordingly, the process 400 facilitates the utilization of zonal signal propagation models and/or zonal fingerprint-based schemes for localization purposes leading to better model fitness to provide better performance for higher localization accuracy.

Figure 5:
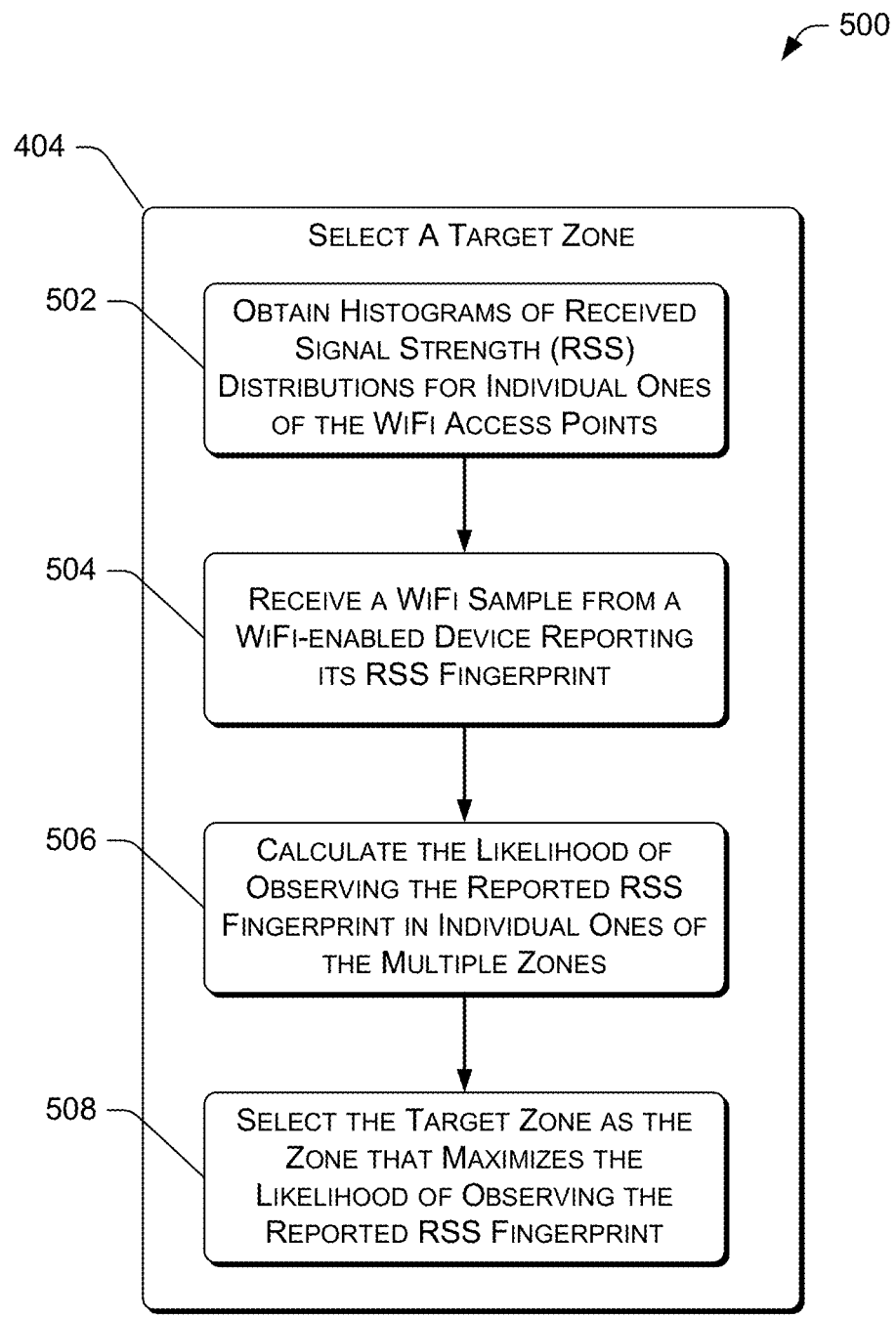
FIG. 5 is a flow diagram of an illustrative process for selecting a target zone during zonal localization.

FIG. 5 is a flow diagram of an illustrative process 500 for selecting a target zone during zonal localization. The illustrative process 500 may be a more detailed process that is included within step 404 of the process 400 shown in FIG. 4. For discussion purposes, the process 500 is described with reference to the architecture 200 of FIG. 2, and specifically with reference to the zone selection component 226.

At 502, the zone selection component 226 obtains histograms comprising RSS probability distributions associated with individual ones of the WiFi APs 104(1)-(P) within an area, such as the area 100 of FIG. 1. At 504, a WiFi sample 206 is received from a WiFi-enabled device 204 that is submitting a location query. This WiFi sample 206 includes all WiFi APs 104(1)-(P) in view (i.e., in range) of the WiFi-enabled device 204 and an RSS fingerprint detailing the RSS measurements at the WiFi-enabled device 204 with respect to each of the WiFi AP 104(1)-(P) in view.

At 506, the zone selection component 226 calculates a likelihood of observing the reported RSS fingerprint in individual ones of the multiple zones 102(1)-(N) of the area 100. In some embodiments, unlikely zones are pruned away in order to consider only those zones in a candidate set using exclusively the histograms of the candidate zones.

At 508, the zone selection component 226 selects a target zone among multiple available zones of an area 100 that maximizes the likelihood of observing the reported RSS fingerprint in the received WiFi sample 206. The process 500 is reflective of the Naïve Bayesian zone selection technique described above as one suitable approach to selecting a target zone with the best locality for the querying WiFi-enabled device 204.

Figure 6:
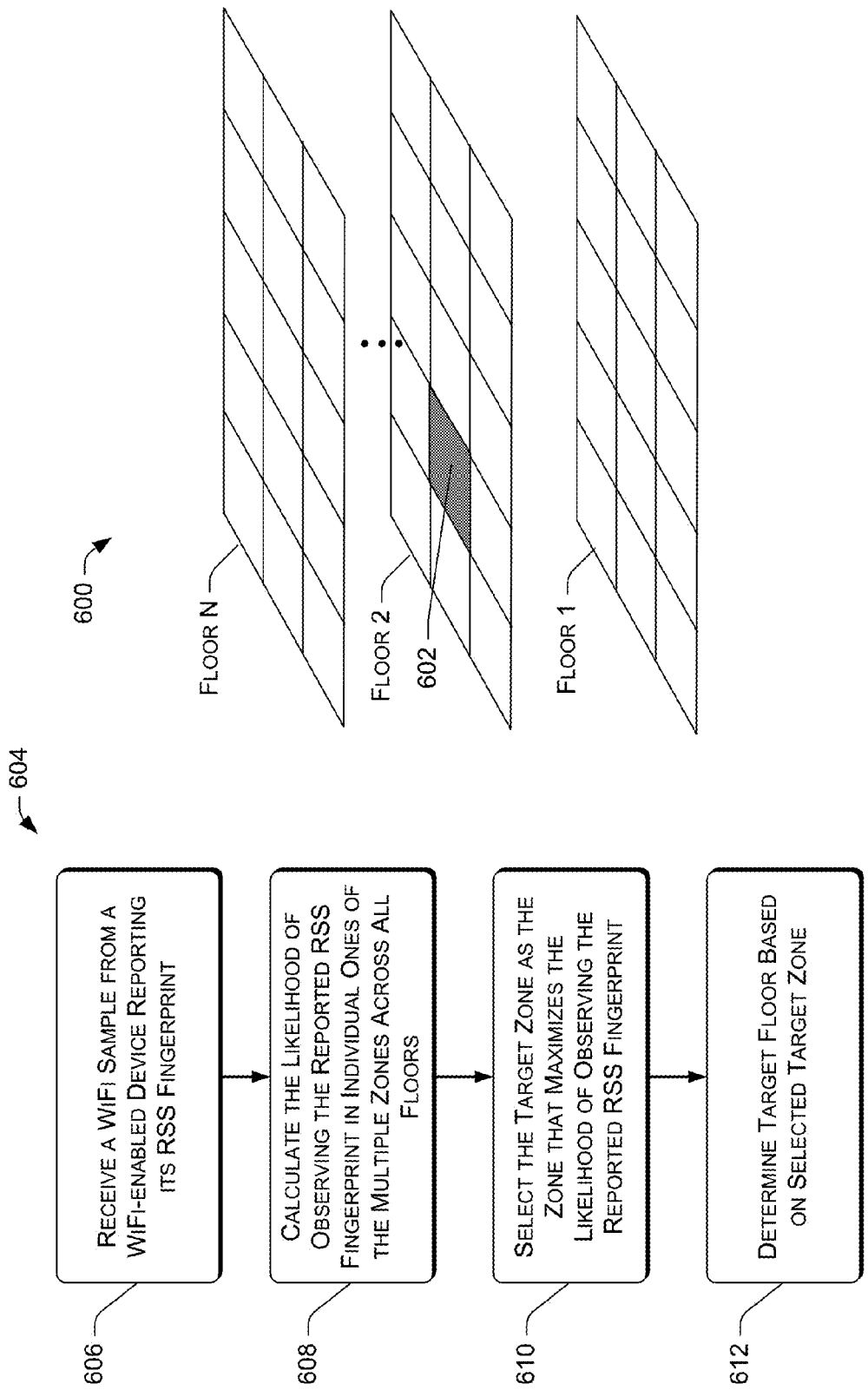
FIG. 6 illustrates an example diagram of an area comprised of multiple floors, as well as a flow diagram of an illustrative process for determining a target floor for zonal localization.

In some cases, an area where localization is to be performed may comprise a space having a 3D volume with multiple floors or levels. FIG. 6 illustrates such an area 600 having multiple floors (1)-(N). In this multi-floor scenario, a target floor among multiple available floors (1)-(N) is to be selected to resolve the location of a WiFi-enabled device 204. Various approaches may be taken to detect a target floor, according to the embodiments disclosed herein. One example approach is to treat each floor as a zone, and to handle zone selection in a similar manner as described above.

Another approach is to partition the floors into multiple zones in a similar manner to that described above, treating each floor as an area. A global signal propagation model may be trained for each floor. Floor detection then becomes a by-product of zone selection. That is, using any of the above-described techniques, a target zone 602 may be selected during a localization process in response to a location query from a WiFi-enabled device 204, and the floor (e.g., in this case, floor 2) associated with the target zone 602 is determined from association information maintained between zones and floors. To resolve the position of a WiFi-enabled device 204, the zonal signal propagation model associated with the target zone 602 may be used, and, in some cases, the global model associated with floor 2 may be used (which may be different from global models associated with the other floors).

FIG. 6 further illustrates a flow diagram of an illustrative process 604 for determining a target floor for zonal localization. At 606, a WiFi sample 206 is received from a WiFi-enabled device 204 that is submitting a location query. This WiFi sample 206 includes all WiFi APs 104(1)-(P) in its view (i.e., in range) and an RSS fingerprint detailing the RSS measurements at the WiFi-enabled device 204 corresponding to each WiFi AP 104 in view.

At 608, the zone selection component 226 calculates a likelihood of observing the reported RSS fingerprint in individual ones of the multiple zones of the area 600. In some embodiments, unlikely zones are pruned away to consider only those zones in a candidate set using only the histograms of the candidate zones.

At 610, the zone selection component 226 selects a target zone 602 among multiple available zones of an area 600 that maximizes the likelihood of observing the reported RSS fingerprint in the received WiFi sample 206. At 612, a target floor is determined based on the selected target zone 602.

Figure 7:
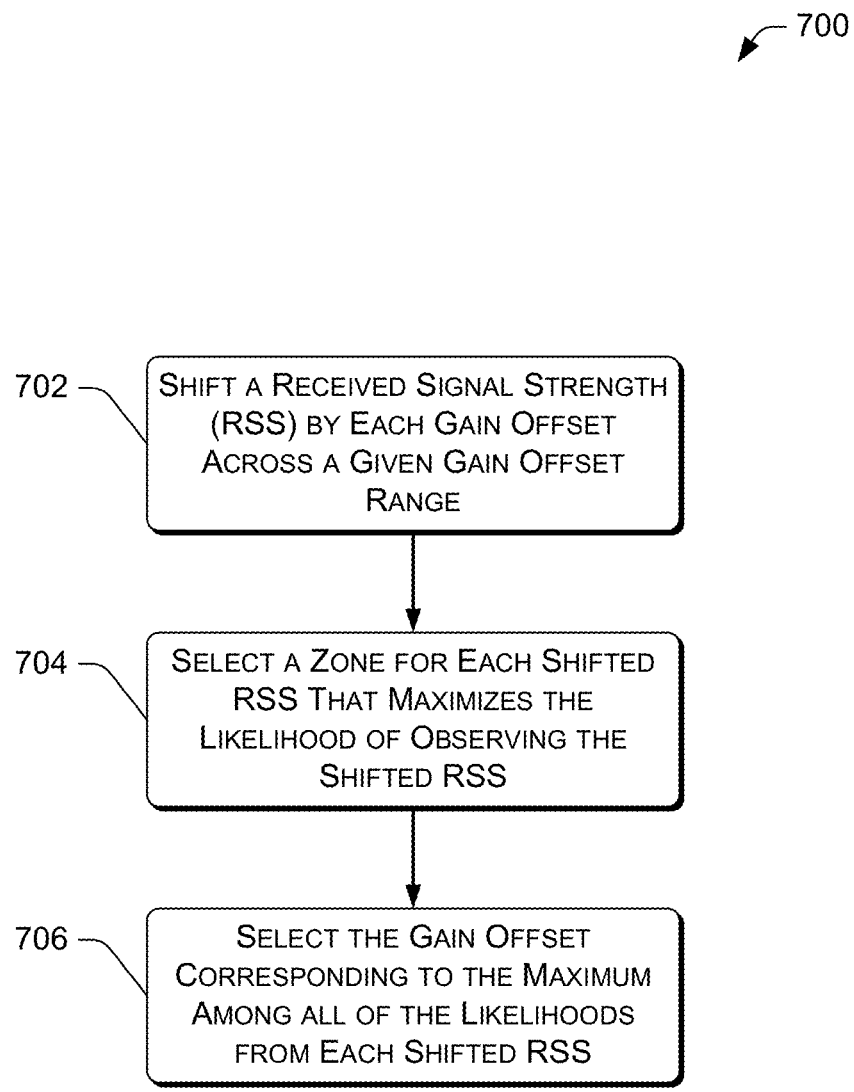
FIG. 7 is a flow diagram of an illustrative process for device gain diversity compensation.

FIG. 7 is a flow diagram of an illustrative process 700 that compensates for device gain diversity. That is, different WiFi-enabled devices 204(1)-(N) tend to report different WiFi signal strength measurements (i.e., different sensitivity) even at the same location. Such device gain diversity among different WiFi-enabled devices 204(1)-(N) affects the model-based localization process, including which zone is to be selected as the target zone. The training samples in the survey data 212 may also be affected by device gain diversity if different devices are used to collect training samples for model training.

At 702, a RSS measurement from a WiFi-enabled device 204 is shifted by multiple gain offset values in a range of possible gain offsets. For example, a gain offset range of −20 dB to +20 dB may be used as the gain offset range, and a given RSS measurement in a WiFi sample 206 is then offset iteratively across the range of possible gain offsets. For example, one shift may offset the measured RSS by −20 dB, while the next shift may offset the measured RSS by −19 dB, and so on, until the last shift offsets the measured RSS by +20 dB.

At 704, each shifted RSS measurement is analyzed with respect to the likelihood of observing the respective shifted RSS measurement in individual ones of the multiple zones of the area 100, and the zone that maximizes the likelihood of observing the shifted RSS is selected. At 706, the gain offset corresponding to the maximum among all of the likelihoods from each shifted RSS measurement is selected at 706 as the gain offset for the received RSS measurement. In some embodiments, the zone selected at 704 may be the target zone for purposes of localization, such as the target zone selected at 404 of the process 400 of FIG. 4. In this scenario, the gain offset may be used during a localization process, such as the process 400 of FIG. 4.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A computer-implemented method comprising:
receiving a location query associated with a wireless communication device;
dividing, by one or more processors, an area into multiple zones, individual zones of the multiple zones being located at least partially within the area, and individual zones of the multiple zones being associated with respective zonal signal propagation models;
determining, by the one or more processors, an estimated location of the wireless communication device within the area, the estimated located being based at least in part on a global signal propagation model associated with the area;
selecting, by the one or more processors, a target zone among the multiple zones that is closest to the estimated location of the wireless communication device; and
determining, by the one or more processors, a final estimated location of the wireless communication device based at least in part on a zonal signal propagation model associated with the target zone, the zonal signal propagation model being one of the respective zonal signal propagation models.

2. The computer-implemented method of claim 1, further comprising generating the zonal signal propagation model associated with the target zone based on training samples observed exclusively within the target zone.

3. The computer-implemented method of claim 2, further comprising determining that a number of the training samples observed meets or exceeds a threshold number of training samples before generating the zonal signal propagation model.

4. The computer-implemented method of claim 1, wherein selecting the target zone further comprises:
   receiving a wireless communication sample from the wireless communication device, the wireless communication sample reporting a received signal strength (RSS) from one or more wireless access points at the wireless communication device;
   using respective histograms of the one or more wireless access points to calculate a likelihood of observing the wireless communication sample in individual zones of the multiple zones; and
   selecting the target zone from among the multiple zones that maximizes the likelihood of observing the wireless communication sample.

5. The computer-implemented method of claim 4, further comprising:
   filtering out individual zones of the multiple zones based on a comparison of wireless access points in the area to the one or more wireless access points reported in the wireless communication sample to obtain a set of candidate zones with at least one common wireless access point to the one or more wireless access points; and
   using histograms corresponding to wireless access points located in individual zones of the set of candidate zones to calculate the likelihood of observing the wireless communication sample in the individual zones of the set of candidate zones.

6. The computer-implemented method of claim 1, wherein selecting the target zone comprises determining that a center of the target zone is closer to the estimated location than other centers of other zones of the multiple zones.

7. The computer-implemented method of claim 1, wherein selecting the target zone further comprises:
   selecting a subset of zones among the multiple zones based on respective distances from individual zones of the multiple zones to the estimated location;
   determining respective estimated locations of the wireless communication device according to respective zonal signal propagation models associated with each zone in the subset of zones; and
   selecting the target zone as a zone among the subset of zones that minimizes a model fitness error for the respective zonal signal propagation models.

8. The method of claim 1, wherein the zonal signal model associated with the target zone includes one of a path loss signal propagation model or a linear model.

9. A system comprising:
   one or more processors; and
   one or more memories storing computer-executable instructions that, upon execution by the one or more processors, cause performance of operations comprising:
      receiving a location query associated with a wireless communication device;
      determining a first location estimate of the wireless communication device within an area based at least in part on a global signal propagation model associated with the area as a whole;
      selecting a target zone among multiple available zones of the area, the target zone being associated with a zonal signal propagation model, each of the multiple available zones located at least partially within the area;
      determining a second location estimate of the wireless communication device within the area based at least in part on the zonal signal propagation model;
      determining that a first model fitness error of the global signal propagation model is less than a second model fitness error of the zonal signal propagation model; and
      determining a final location estimate of the wireless communication device based at least in part on the global signal propagation model.

10. The system of claim 9, wherein selecting the target zone comprises:
   receiving a wireless communication sample from the wireless communication device, the wireless communication sample reporting a received signal strength (RSS) from one or more wireless access points at the wireless communication device;
   using respective histograms of the one or more wireless access points to calculate a likelihood of observing the wireless communication sample within individual zones of the multiple available zones; and
   selecting the target zone as a zone among the multiple available zones that maximizes the likelihood of observing the wireless communication sample.

11. The system of claim 10, the operations further comprising:
   shifting the RSS reported in the wireless communication sample by multiple gain offsets across a range of possible gain offsets to obtain multiple shifted RSS measurements;
   for individual shifted RSS measurements of the multiple shifted RSS measurements, selecting respective zones of the multiple available zones that maximize a likelihood of observing the individual shifted RSS measurements; and
   selecting a gain offset among the multiple gain offsets corresponding to a maximum among multiple likelihoods determined for the individual shifted RSS measurements.

12. The system of claim 9, the global signal propagation model is generated for individual wireless access points of multiple wireless access points within the area.

13. The system of claim 9, wherein determining the second location estimate comprises selecting a set of candidate zones including the target zone, and wherein the operations further comprise:
   determining respective zonal signal propagation models associated with each zone in the set of candidate zones;
   applying the respective zonal signal propagation models to estimate respective locations of the wireless communication device for each of the candidate zones; and
   resolving the second location estimate as an average of the respective locations.

14. The system of claim 9, wherein the zonal signal propagation model is generated based on training samples observed exclusively within the target zone.

15. The system of claim 9, wherein selecting the target zone comprises selecting the target zone as a zone having a center that is closer to the estimated location than other centers of other zones of the multiple available zones.

16. A computer-implemented method comprising:
partitioning, by one or more processors, an area into multiple zones, individual zones of the multiple zones being associated with respective zonal signal propagation models;
receiving a location query associated with a wireless communication device;
determining, by the one or more processors, an estimated location of the wireless communication device within the area, the estimated location being based at least in part on a global signal propagation model associated with the area;
selecting, by the one or more processors, a target zone among the multiple zones that is closest to the estimated location of the wireless communication device; and
determining, by the one or more processors, a final estimated location of the wireless communication device based at least in part on a zonal signal propagation model associated with the target zone, the zonal signal propagation model being one of the respective zonal signal propagation models, wherein the zonal signal propagation model associated with the target zone and the global signal propagation model associated with the area are path loss signal propagation models.

17. The computer-implemented method of claim 16, further comprising:
collecting training samples reporting received signal strength (RSS) at different locations within the target zone; and
obtaining a set of parameters of the zonal signal propagation model for individual wireless access points in the target zone based on the multiple training samples.

18. The computer-implemented method of claim 16, wherein partitioning the area into the multiple zones comprises:
determining sub-areas within the area that contain at least a threshold number of observed training samples; and
designating each sub-area as a separate zone of the multiple zones.

19. The computer-implemented method of claim 16, wherein selecting the target zone further comprises:
receiving, from one or more wireless access points at the wireless communication device, a wireless communication sample;
obtaining a set of candidate zones with at least one common wireless access point to the one or more wireless access points through filtering out individual zones of the multiple zones based on a comparison of wireless access points in the area to the wireless access points reported in the wireless communication sample; and
calculating a likelihood of observing the wireless communication sample in the individual zones of the set of candidate zones using probability distributions corresponding to wireless access points located in individual zones of the set of candidate zones.

20. The computer-implemented method of claim 16, wherein selecting the target zone further comprises:
identifying, based at least in part on respective distances from individual zones of the multiple zones to the estimated location, a subset of zones among the multiple zones;
determining, based on respective zonal signal propagation models associated with each zone in the subset of zones, respective estimated locations of the wireless communication device; and
selecting the target zone, from the subset of zones, that minimizes a model fitness error for the respective zonal signal propagation models.

* * * * *